Patented May 29, 1951

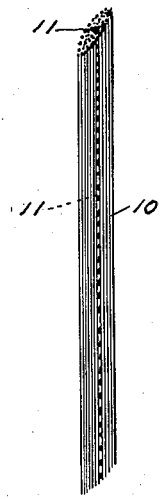
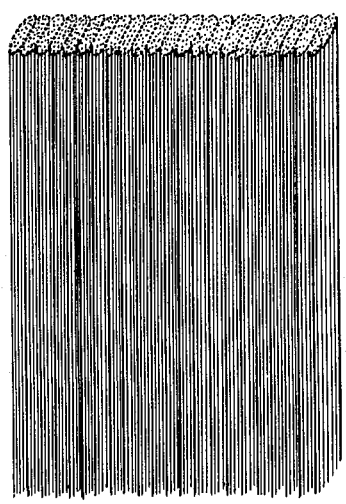
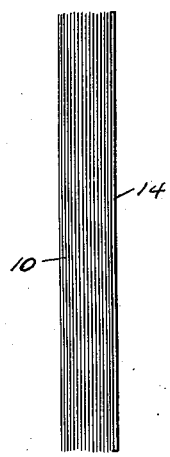
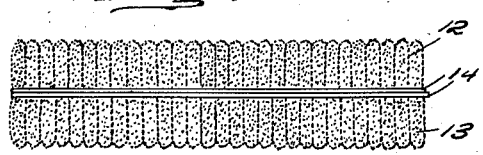
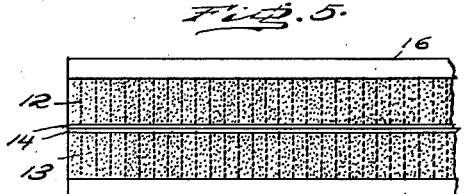
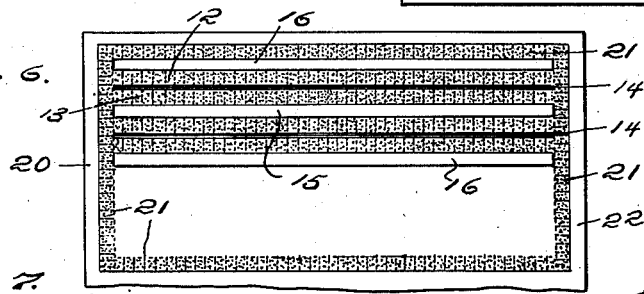
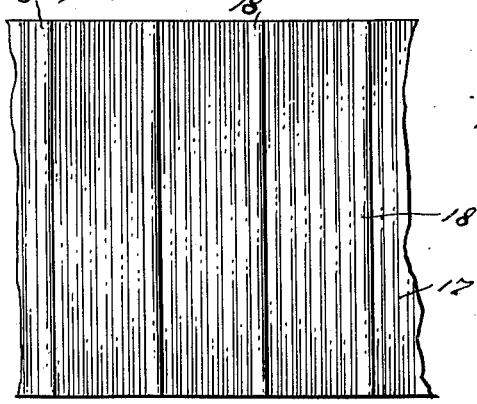
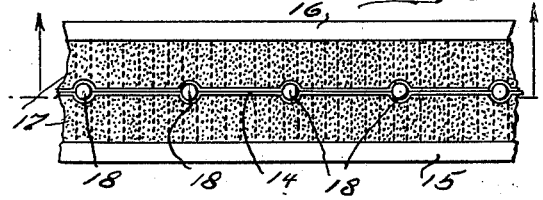

2,555,225

UNITED STATES PATENT OFFICE 2,555,225

SEPARATOR FOR STORAGE BATTERIES

Leon A. Doughty, Glenside, Pa., assignor to C & D Batteries, Inc., Conshohocken, Pa., a corporation of Pennsylvania Application September 8, 1949, Serial No. 114,583

4 Claims. (Cl. 136—145)

The present invention relates to storage batteries and more particularly to a new and improved separator for use between the positive and negative plates thereof.

Separators as heretofore used have been made of rubber, wood, cellulose, felted thin glass mats and various combinations of such material. In mats formed of glass threads, the latter are interspersed in criss-cross formation with no definite attempt to arrange the threads in a uniformly parallel manner having a truly defined direction. All of these prior separators are attempts to solve the problem, long a plague to battery manufacturers, of preventing shedding of the active material, which results in granules of the material floating into contact one with another to produce the undesirable "treeing" effect and short circuits. Furthermore, such attempts have introduced other undesirable factors, such as restricting acid circulation and blocking proper escape of gases.

Some of the objects of the present invention are: to provide an improved separator for battery plates; to provide a separator which so controls the shedding of active material that floating granules of material are prevented from "treeing" and short circuiting the battery cell; to provide a separator formed of glass slivers so arranged that the laminations thereof lie face to face so that when assembled between the plates of a battery cell the laminations are substantially ninety degrees to the plane of the plate; to provide a separator formed of glass laminations so disposed that when assembled in a battery accurately formed vertical channels serve to permit free escape of gases without restricting acid circulation; to provide a laminated glass mat separator having self-cushioning characteristics to automatically compensate for irregularities in the face of a battery plate, and to confine the active material so that granules thereof are prevented from being displaced; to provide a separator having acid-proof reinforcing means to prevent any buckling of the plate from affecting the efficiency of the separator by blocking the provided vertical channels; to provide a separator capable of resisting the heat required to dry out the plates where batteries are sold dry charged; and to provide other improvements as will hereinafter appear.

In the accompanying drawings Fig. 1 represents a perspective of a portion of a length of glass sliver or tape from which row laminations form the separator of the present invention; Fig. 2 represents a perspective of tape laminations as arranged face to face in making the separator; Fig. 3 represents an end elevation of a row of tape laminations showing the binding in place; Fig. 4 represents a plan of the two mat separator showing the mats with the binding back to back; Fig. 5 represents a plan of the separator in operative position between the positive and negative plates of a battery; Fig. 6 represents a fragmentary transverse section of a battery showing one cell thereof and illustrative of the separator and cell plate assembly and including a modification of the invention; Fig. 7 represents a sectional elevation of a separator of the invention embodying a reinforcing means; and Fig. 8 represents a plan of the separator of Fig. 7.

Referring to the drawings, a sliver or tape 10 formed of a multiplicity of continuous glass fibers running lengthwise thereof in parallel relation serves as the medium from which the novel separator of the invention is constructed, this drawing of the sliver being generally facilitated by incorporating a thread of nylon 11 therein. In assembling the separator, the sliver 10 is cut into uniform lengths corresponding to the length of the battery plate to be covered by the finished separator, while the number so cut will correspond to the width of the plate when laid face to face in contact relation. Preferably the number cut will be twice the width of the battery plate so that two mats 12 and 13 of face to face tapes or laminations are prepared, each mat being backed on one face with a thin layer 14 of suitable soluble adhesive bonding material such as starch. This bonding is to maintain the slivers or tapes 10 properly arranged for handling and installing between the battery plates. The two mats of arranged slivers or tapes when placed bonded back to bonded back, between the positive plate 15 and the negative plate 16 of a pair of plates of a battery cell, form the novel separator of the invention. When thus assembled, the respective tape faces of each mat are approximately ninety degrees to the plates and provide a multiplicity of vertical paths for gases released from the plates.

It should be noted that by this ninety degree arrangement each mat is relatively thick and when superposed laterally against the companion mat, a double thick separator results to form a thick resilient cushion capable of self-seating on the face of a plate regardless of irregularities therein. An important functioning of the cushioning effect is to put pressure upon the active material of the positive plate to hold this material firmly in place and thereby prevent shedding or displacement of active material granules.

From the foregoing it will be seen that the separator is formed of two juxtaposed mats of bonded tapes spaced by the built-up glass fibers into a cushion, all fibers of which run vertically, and while the mats parallel the plate the planes of the respective tapes are at approximately ninety degrees to the plate.

In the form of the invention shown in Figs. 7 and 8, the two mat separator 17 is shown provided with a plurality of rods 18 arranged at intervals throughout the width of the separator and of a length, preferably, substantially equal to the length of the separator. These rods 18 are formed of glass or other acid resistant substance of sufficient rigidity to resist any buckling or twisting of plate and keep adjacent plates from coming in contact with one another, and producing a short circuit in battery. In assembling this form of the invention the two mats are placed back to back and the rods 18 then pressed into place in parallel spaced relation so that each stands vertically and parallel to the laminations or tapes.

In the form of the invention shown in Fig. 6, one cell 20 of a battery illustrates the separator of the invention arranged not only between pairs of plates but forming a complete lining 21 around the inner wall of the cell case 22. Each such lining 21 is formed by one or two layers made as described for the invention shown in Figs. 1 to 7 of the drawings, with vertically disposed laminations lying in the same plane and with each lamination in face to face contact. By enclosing the plate and separator parts within a lining of cushioned construction, preventing any loose particles of oxide that may be in solution coming in contact with plates, causing "mossing."

Having thus described my invention, I claim:

1. A battery separator formed by two mats arranged in back to back relation, each mat comprising a plurality of tapes formed of longitudinally disposed glass fibers, said tapes being arranged vertically in row formation face to face to locate said tapes edgewise at ninety degrees to a battery plate when in operative position.

2. A battery separator formed by two mats arranged in back to back relation, each mat comprising a plurality of tapes formed of longitudinally disposed glass fibers, said tapes being arranged vertically in row formation face to face to locate said tapes edgewise at ninety degrees to a battery plate when in operative position, and means bonding the tapes of each mat together.

3. A battery separator formed by two mats arranged in back to back relation, each mat comprising a plurality of tapes of such width as will form a relative thick cushion, said tapes being formed of longitudinally disposed glass fibers and being arranged vertically in row formation side to side to locate said tapes edgewise at approximately ninety degrees to a battery plate when in operative position.

4. A battery separator formed by two mats arranged in back to back relation, each mat comprising a plurality of tapes of such width as will form a relative thick cushion, said tapes being formed of longitudinally disposed glass fibers and being arranged vertically in row formation side to side to locate said tapes edgewise at approximately ninety degrees to a battery plate when in operative position, and means bonding the tapes of each mat together.

LEON A. DOUGHTY.

REFERENCES CITED

The following references are of record in the file of this patent:

UNITED STATES PATENTS

| Number | Name | Date |
|---|---|---|
| 1,269,778 | Becker | June 18, 1918 |
| 1,331,018 | Luthy | Feb. 17, 1920 |
| 1,500,353 | Willard | July 8, 1924 |
| 1,671,335 | Willard | May 29, 1928 |
| 1,905,319 | Sturges | Apr. 25, 1933 |
| 2,117,371 | Slayter | May 17, 1938 |
| 2,311,704 | Simison | Feb. 23, 1943 |
| 2,477,555 | Roberts et al. | July 26, 1949 |

FOREIGN PATENTS

| Number | Country | Date |
|---|---|---|
| 21,472 | Great Britain | Sept. 28, 1906 |
| 451,628 | Great Britain | Aug. 10, 1936 |
| 580,390 | Great Britain | Sept. 5, 1946 |
| 875,272 | France | Sept. 14, 1942 |